April 21, 1964     E. F. GRAHAM     3,130,296
BRAZING AND HEAT TREATING APPARATUS
Filed Sept. 27, 1961     2 Sheets-Sheet 1

INVENTOR.
EDWARD F. GRAHAM
BY Wade Root
Arsen Tashjian
ATTORNEYS

April 21, 1964  E. F. GRAHAM  3,130,296
BRAZING AND HEAT TREATING APPARATUS
Filed Sept. 27, 1961  2 Sheets-Sheet 2

INVENTOR.
EDWARD F. GRAHAM
BY Wade Knontz
Araim Tashjian
ATTORNEYS

United States Patent Office 3,130,296
Patented Apr. 21, 1964

3,130,296
BRAZING AND HEAT TREATING APPARATUS
Edward F. Graham, Baltimore, Md., assignor to the United States of America as represented by the Secretary of the Air Force
Filed Sept. 27, 1961, Ser. No. 141,226
6 Claims. (Cl. 219—149)

This invention relates to apparatus for brazing and/or heat treating structural elements and is more particularly concerned with providing apparatus which is useful in the heat treatment or brazing of contoured structural panels such as aircraft fuselage and wing sections, floor panels, tail panels and sandwich type structural elements.

Heretofore, and with presently available heat treating and brazing apparatus, it has been the practice to fabricate various multiple contoured sandwich structural elements by first constructing male and female heaters which conform to the contour of the element being fabricated. Each structural element having a particular curvature would necessarily require the use of a different, close tolerance, multiple piece, male and female mold which would correspond to the curvature of the element being fabricated. Thus, in the manufacture of aircraft structural panels by presently known methods, it is customary to provide a relatively large number of molds, one set for each panel to be fabricated. The method and apparatus in accordance with this invention eliminates the necessity of manufacturing separate close tolerance molds for each panel and instead allows a single apparatus to be utilized in the fabrication of substantially all of the various panels of the aircraft structure.

Accordingly, it is an object of the present invention to provide apparatus for brazing and heat treating multiple contoured structural panels, especially sandwich panels used in the manufacture of aircraft sections.

Another object of the invention is to provide a single apparatus which can be used for fabricating structural elements of any configuration thereby eliminating the requirement of a separate set of molds for each panel of unique configuration.

Still another object of the present invention is to provide an apparatus which is capable of heat treating and brazing relatively large contoured structural sections without warping or distorting the desired configuration of the finished panel by distributing the heat evenly over the entire area of the panel.

A further object of the invention is to provide forming apparatus for fabricating brazed structural panels wherein the dimensional stability is maintained to close tolerance by the provision of reasonably uniform brazing temperatures and pressures over the entire surface area of the work.

A still further object of the invention is to provide heat treating and brazing apparatus which allows a non-oxidizing atmosphere to be established around the work area or the entire apparatus.

These and other objects, features and advantages, including the flexibility and general utility resulting from the greatly reduced labor and development costs of tooling, will become more apparent from the following description of a preferred embodiment in conjunction with the accompanying drawings wherein.

Figure 3:
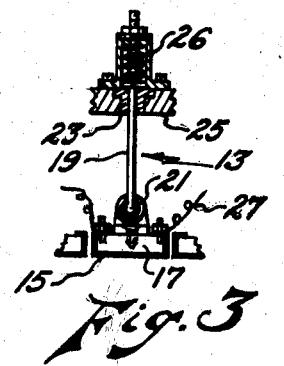
FIG. 3 is a view in section of the pivotably mounted heating elements.
Figure 4:
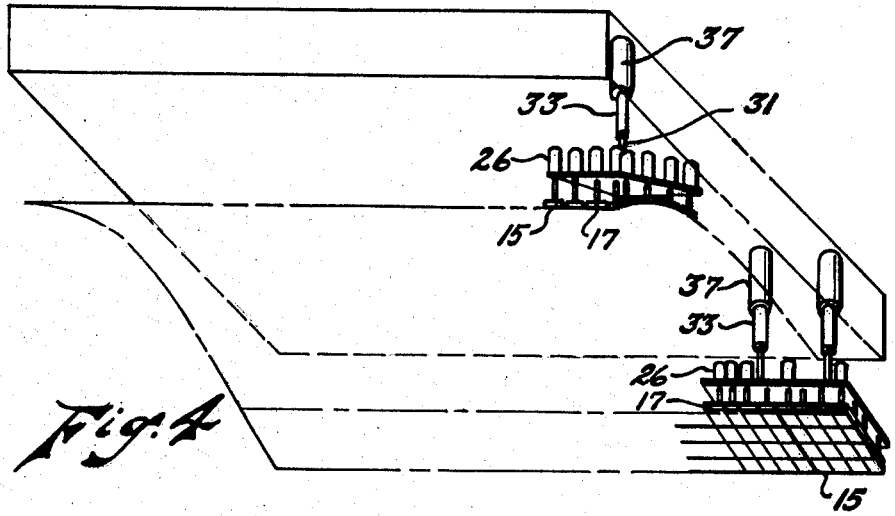
FIG. 4 is a partial fragmentary view of the platen assembly with attached baffles and heating elements.
Figure 5:
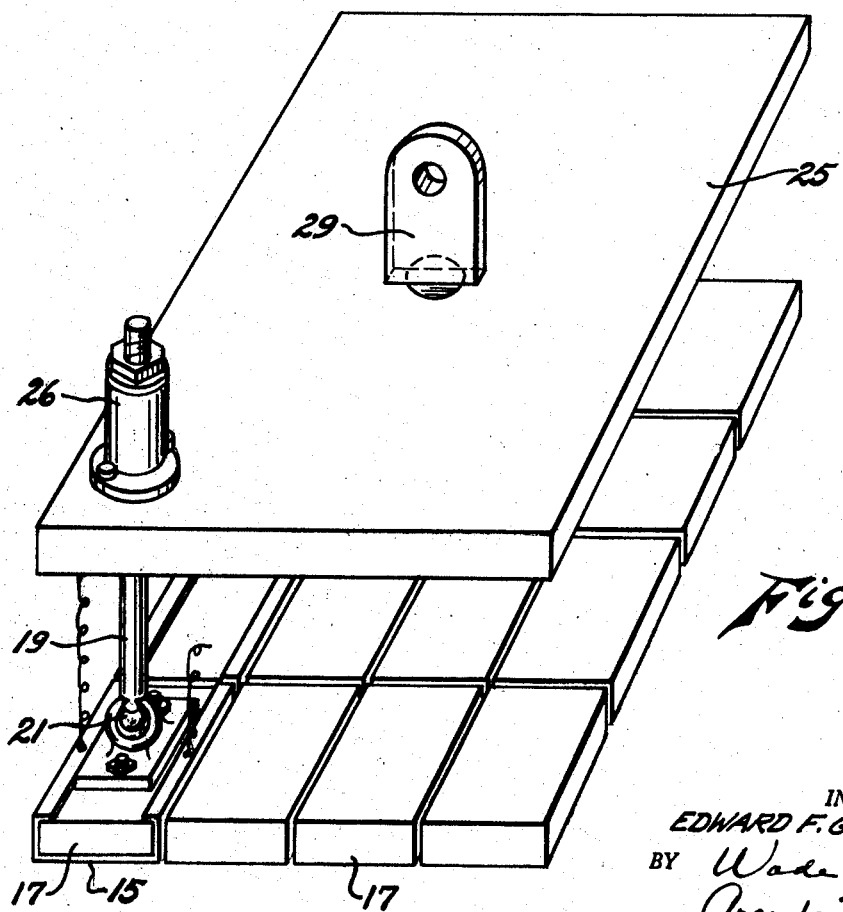
FIG. 5 is a view in perspective of a single baffle with the pivotably mounted heating elements attached thereto.

Referring to the drawings wherein like reference characters designate like parts throughout the several views, the brazing and heat treating apparatus constructed according to the invention is comprised of a series of universally mounted heat generating elements 13 shown in detail in FIG. 3. Each of the elements 13 includes a ribbon type resistance heater 15 covering the contact surface of a heat resistant block of material 17. An upright shaft 19 is attached to the upper surface of the block 17 by means of a suitable universally pivotable ball joint connection 21.

The shaft 19 passes through the bushing 23 in a heat resistant baffle 25. Spring biasing means 26 are provided to urge the shaft 19 with the attached block 17 downward away from the baffle 25 and against the work surface. Asbestos covered lead wires 27 are provided for interconnecting and conducting current to the heaters 15 of the heat generating elements 13.

At the center of the upper surface of the baffle 25 there is attached an apertured member 29 which engages the yoke 30 at the lower end of a main shaft 31 to form a joint which swivels in one direction. The main shaft 31 is adjustable in the vertical direction by turning into the internally threaded tubular piston 33. A lock nut 35 is provided for maintaining the shaft 31 and piston 33 in a fixed relative position.

An hydraulic assembly including a cylinder 37 having first and second inlets 39 and 41, respectively, is provided for driving the piston 33 downward or upward depending upon the location of the hydraulic assembly and the nature of the procedure. Fluid under pressure admitted into the first inlet 39 acts to urge the piston 33 with its attached baffle 25 and heat generating elements 13 against the work surface. Pressurized fluid admitted into the second inlet 41 operates to release the work by urging the heater in the opposite direction away from the work.

When the pressure is applied to the piston 33, the baffle 25 is urged toward the work surface. The attached heat generating elements 13 connected to the baffle 25 through the shaft 19 are also urged toward the work surface until the heating element 15 actually comes into contact therewith. As the elements 13 are pressed against the work, the configuration of the work surface is transferred thereto by the relative angular movement of the elements 13 and vertical movement of the upright shaft 19. Thus, because of the universal type ball joint 21 and the spring biased vertically movable shaft 19, the elements 13 are capable of complete conformity with the configuration of the work surface.

Figure 1:
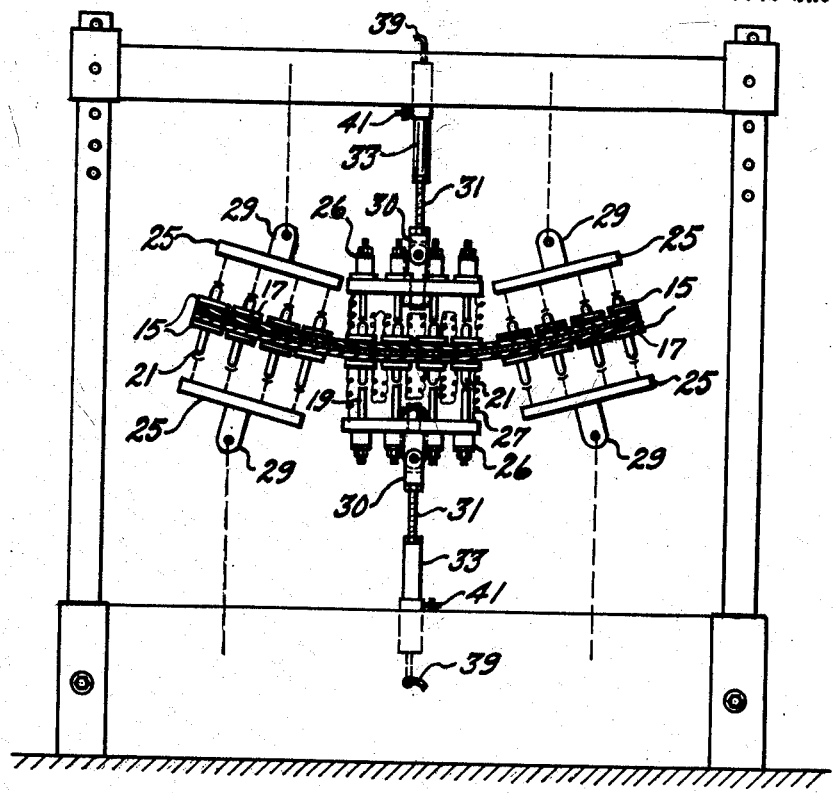
FIG. 1 is a schematic view of a machine embodying this invention.
Figure 2:
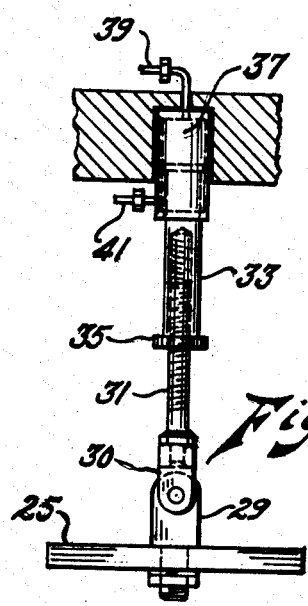
FIG. 2 is a sectional view in detail of a main baffle support cylinder.

In operation, the apparatus would be used in conjunction with a master section. For example, in aircraft structure, a master form of the particular section or panel to be manufactured would be placed in position in an hydraulic press type machine as shown in FIG. 1. The vertical screws 31 are adjusted and locked with lock nut 35 so that some portion of each of the heat generating elements 13 is in contact with the master form. The master form is then removed and replaced with an unworked section.

Hydraulic fluid under pressure is then allowed to enter inlets 39 urging the heaters 15 into intimate contact with the work surface. As a result of the structural arrangement of the heat generating elements 13, they are able to duplicate exactly to the configuration of the master form. Under normal operation the hydraulic cylinders 37 are connected serially so that the pressure exerted by each cylinder is substantially uniform. In certain circumstances where it would be desirable to vary the pressure of predetermined portions of the subject area, each of the cylinders 37 may be connected to individually controlled fluid pressure sources.

While applying the pressure, the heaters 15 of the heat generating elements 13 are energized in order to create and transmit heat to the work surface. Brazing and heat treating operations may then be performed on the section being fabricated. Thus, it will be found that in the fabrication of structural elements as, for example, aircraft panel sections, may be assembled into an integral structure at a great saving in time and labor without sacrifice of accuracy.

Another way in which the apparatus may be used to perform the heat treating and brazing operations on a work section is to provide locks (not shown) for the universally attached heaters 15. The locks would preclude movement of the flexible elements out of contour during heating, so that, when forming a concave-convex panel, one set of flexible elements is locked to the contour of the master form. The master form is then removed and replaced by an unworked piece. On applying pressure to the unworked piece by urging the opposite set of elements toward the locked set, the contour of the master form which has been transferred to the locked elements, is then duplicated by the unworked piece. The heat is then applied, resulting in a brazed and heat treated section which is identical to the contour of the master form.

It will be understood that various modifications in detail may be made in the apparatus according to this invention by those skilled in the art without departing from the time, spirit and scope of the invention as defined in the appended claims.

What I claim is:

1. Apparatus for fabricating curved structural members from plates, said apparatus comprising a plurality of universally pivotably mounted heat generating elements for contacting and heating a work piece, a baffle member for supporting said heat generating elements in lateral relationship to each other, guides in said baffle member for aligning said heating elements for vertical movement relative thereto, and hydraulic means for urging said baffle and heating elements against the surface of the plate to press said plate into conformity with a predetermined configuration while simultaneously applying heat thereto through said heat generating elements.

2. The apparatus defined in claim 1 wherein said baffle member is provided with an upstanding apertured portion at substantially the center of the upper surface thereof, said apertured portion being engageable with a yoke extending from said hydraulic means, said yoke and apertured portion forming a swivel joint to allow a unidirectional rotational motion of said baffle.

3. The apparatus defined in claim 1 wherein said plurality of heat generating elements are electrically energized, each of said elements being serially connected to provide substantially uniform heat over the entire surface of the plate.

4. Apparatus for fabricating curved structural members from plates, said apparatus comprising a plurality of universally pivotable heat generating elements having a substantially flat heating surface, upright shafts attached to the opposite side of each of said heat generating elements, a baffle member having guides mounted therein for retaining said upright shafts in spaced alignment with one another, said shafts being vertically slidable within said guides, and hydraulic means for urging said baffle and heating elements against the surface of the plate to press said plate into conformity with a predetermined configuration while simultaneously applying heat thereto through said heat generating elements.

5. The apparatus defined in claim 4 wherein biasing means are provided for maintaining the heat generating element against the surface of the plate, said biasing means being located on said upright shaft remote from said heating element.

6. The apparatus defined in claim 4 wherein said hydraulic means comprises a double-acting piston within a cylinder having two pressure inlets, one of said inlets operating to urge said baffle and heat generating elements away from the surface of the plate.

References Cited in the file of this patent

UNITED STATES PATENTS

| | | |
|---|---|---|
| 2,286,945 | Andrews et al. | June 16, 1942 |
| 2,372,516 | Rechton et al. | Mar. 27, 1945 |
| 3,009,507 | Toderick | Nov. 21, 1961 |